United States Patent [19]

Higgison et al.

[11] Patent Number: 4,994,666

[45] Date of Patent: Feb. 19, 1991

[54] OPTICAL DISC COUNTER

[75] Inventors: John R. Higgison; Thomas E. Derriso, both of Huntsville, Ala.

[73] Assignee: Disctronics Manufacturing, Inc., Huntsville, Ala.

[21] Appl. No.: 454,379

[22] Filed: Dec. 21, 1989

[51] Int. Cl.[5] ............ G01V 9/04

[52] U.S. Cl. ............ 250/222.2; 377/8

[58] Field of Search ............ 377/53, 8; 414/901, 414/675; 901/47

[56] References Cited

U.S. PATENT DOCUMENTS

| | | | |
|---|---|---|---|
| 4,298,790 | 11/1981 | Decker et al. | 377/8 |
| 4,756,012 | 7/1988 | French, III | 377/8 |
| 4,770,590 | 9/1988 | Hugues et al. | 901/47 |

*Primary Examiner*—David C. Nelms

*Assistant Examiner*—Que Tan Le

*Attorney, Agent, or Firm*—Willian Brinks Olds Hofer Gilson & Lione

[57] ABSTRACT

An automated, optical-mechanical apparatus includes a laser, a series of lenses for focusing a measuring beam generated by the laser to a precise focal distance and dispersion angle, a lead screw for linearly translating the beam and a spindle for aligning the optical discs to be scanned and counted. The beam is focused to the edge of the stacked discs and propagates through the gaps between adjacent discs to an optical detectors where the beam is transformed to an electronic waveform, which is interpreted by a digital counting network. Counting accuracy is not dependent upon precise control of manufacturing variations in the thickness and weight of the discs.

11 Claims, 4 Drawing Sheets

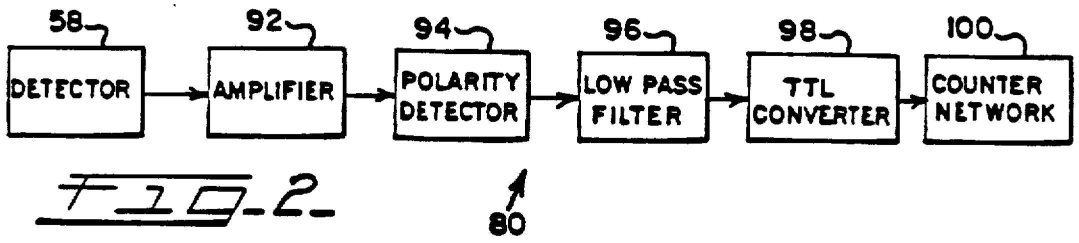
FIG-2
FIG-1
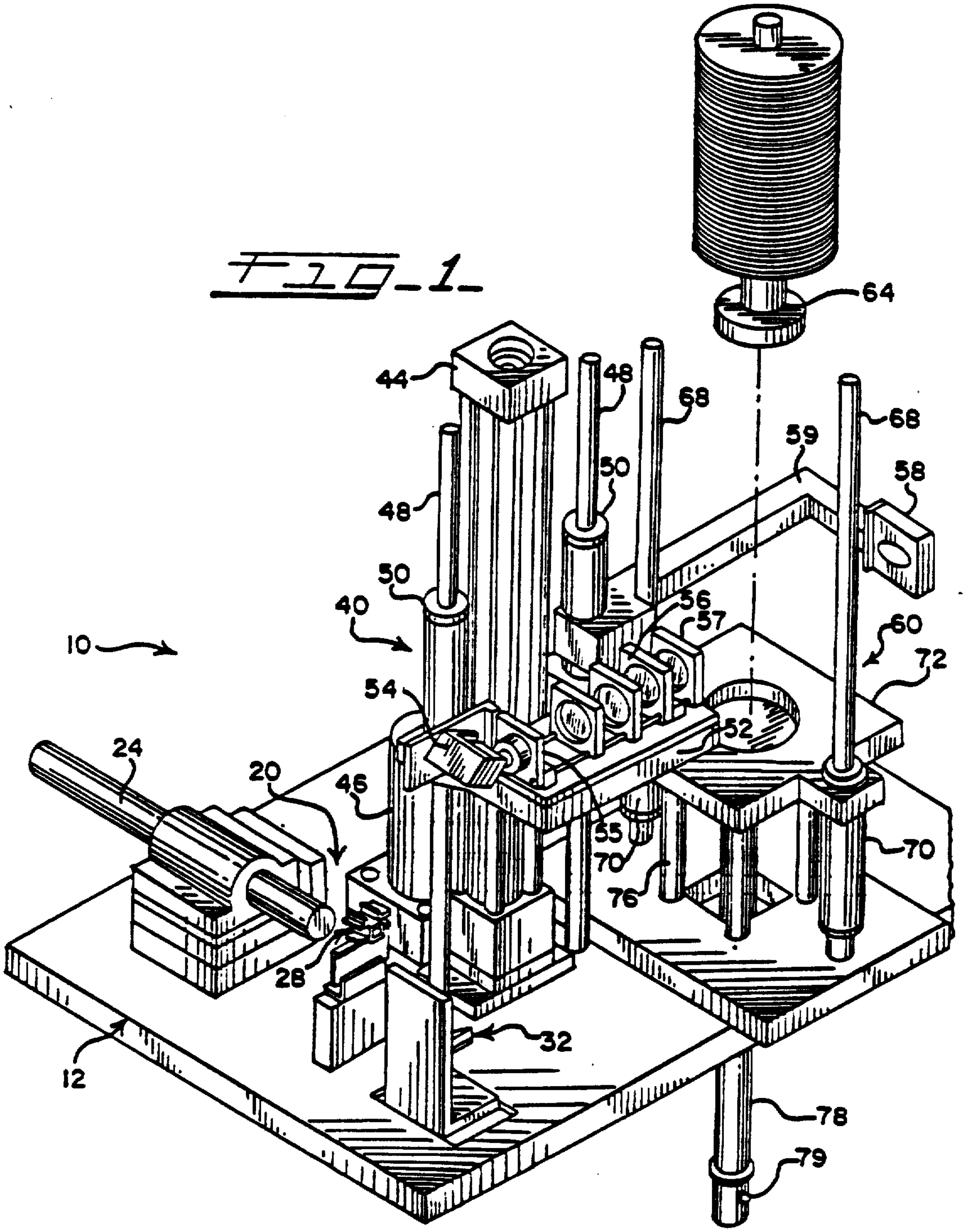

OPTICAL DISC COUNTER

BACKGROUND OF THE INVENTION

Accurate counting techniques are particularly useful to manufacturers of optical compact discs, who need to determine the number of discs packaged in a stack of discs prior to shipment. Manufacturers have tried various techniques, including simply measuring the height of a stack of discs.

Each optical disc is manufactured to a certain thickness, plus or minus a certain tolerance. When many of these discs are stacked on top of each other the cumulative tolerance can easily constitute more than one disc. Due to this large, cumulative tolerance, linear measuring techniques do not yield an accurate count of the number of discs in a stack.

Another technique manufacturers have used is weighing the stack of discs. Apparently, the variation in the weight of each disc is not as significant as the variance in thickness. Therefore, although some variation exists in the weight of each disc, manufacturers can achieve a more accurate, albeit not completely certain, count.

However, the commercially practical weight tolerances create some uncertainty in the result, so a manufacturer cannot achieve a completely accurate count through weighing techniques. As a result, a need exists for a more accurate, automated method for counting optical discs.

SUMMARY OF THE INVENTION

This invention provides an optical system for counting the discs in a stack. The optical counter of this invention includes a base, means for aligning the stacked discs, an optical source that emits light incident upon the discs, means for detecting the light emitted by the source after the light interacts with the discs of the stack, and means, responsive to the detecting means, for generating a signal representative of the number of discs in the stack.

The preferred embodiment described below uses a focused laser beam to scan linearly along a stack of discs so that the beam is alternatively blocked by the discs, or passes through gaps between adjacent discs. A detector is positioned on the opposite side of the stack of discs to pick up the beam when it passes through this gap and generate an amplitude modulated signal. When the laser beam is blocked by one of the discs, the detector generates only a reduced signal level. Preferably, the beam is focused to its smallest diameter at the point where the beam initially strikes the stacked discs.

The advantages of this invention include primarily an increase in accuracy over the previous methods discussed above. Counting, as opposed to weighing or measuring, is less susceptible to inaccuracies resulting from variations in the dimensions of optical discs, and typical variations in thickness and weight of the optical discs do not adversely impact the count.

Another advantage is the automated nature of the embodiment described below, which reduces the chance of error and thus also increases the accuracy of the count. Other advantages of the invention will become apparent upon consideration of the following description, with reference to the appended drawings, in which:

BRIEF DESCRIPTION OF THE DRAWINGS

FIG. 1 is a perspective view of an optical disc counting system which incorporates a preferred embodiment of this invention;

FIG. 2 is a block diagram of the signal processing system of the embodiment of FIG. 1;

DETAILED DESCRIPTION OF THE PRESENTLY PREFERRED EMBODIMENTS

Figure 3A:
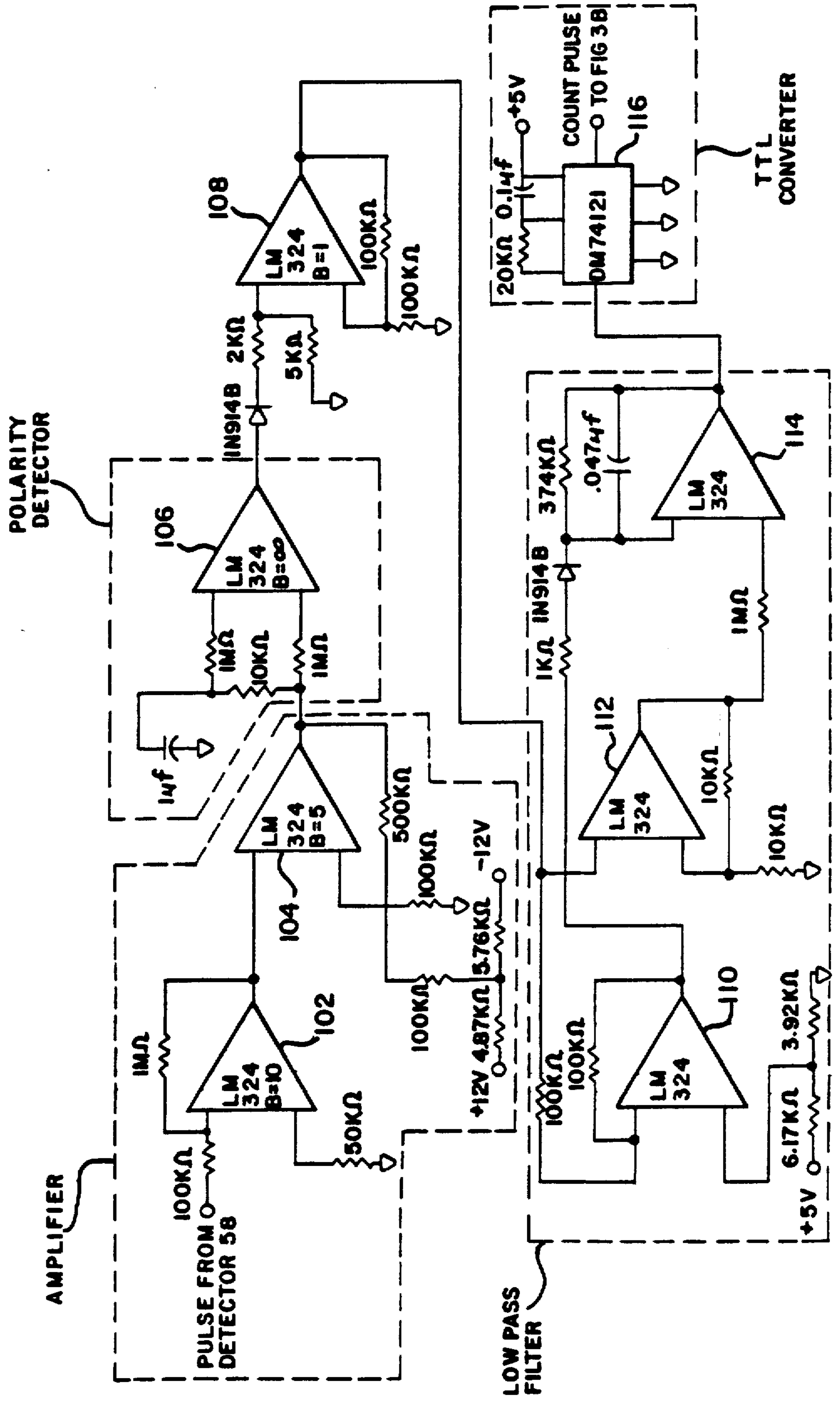
FIGS. 3*a* and 3*b* together make up a schematic diagram of the processing system of FIG. 2.

The preferred embodiment shown in the drawings automatically counts discs in the following manner. Optical discs are inserted onto a spindle so that the centers of the discs are aligned through the center hole in each disc. This spindle is then inserted on top of an elevator that lowers the spindle and discs into an optically and physically isolating housing. Once the stack of discs is completely within this housing a laser beam scans from the bottom of the stack to the top such that the beam passes parallel to the surface of the discs and through the gaps between the discs. When the laser beam encounters a disc it is absorbed or redirected, and not detected by a photo-detector passing on the other side of the stack. In the preferred embodiment, this photodetector passes in the same manner alongside the stack, but on the opposite side as the laser beam.

When the beam passes through the gap between two adjacent discs, the detector picks up the beam and generates a waveform indicative of the number of discs in the stack. The signal generated by the detector is then analyzed by an electronic circuit that determines the number of discs detected. Once the beam has traversed the entire axial length of the stack, the task is complete and the laser is stopped by an electronic shutter. The elevator then lifts the spindle from within the optical housing so that the stack of discs may be removed.

With reference to the drawings, FIG. 1 shows an optical disc counter generally designated by numeral 10. The optical disc counter 10 includes a base 12, to which are mounted a beam source 20, a beam translation system 40, and a stack elevator 60. The beam translation system 40 includes a photodetector 58 that is included in the electronic circuit 80 shown generally in FIG. 2, and in detail in FIGS. 3*a* and 3*b*. The optical disc counter 10 is surrounded by a housing shell (not shown), which provides optical isolation and physical protection. In this preferred embodiment, the beam source 20 generates a measuring beam that is directed through the beam translation system 40, to a stack of discs mounted on the stack elevator 60, to the detector 58.

The beam source 20 can, for example, comprise a helium neon laser 24, a solenoid controlled electronic shutter 28 and a flat mirror 32. In the preferred embodiment, the laser 24 is a one milliwatt laser that is mounted to the base 12 so that the beam propagates parallel to the base. The electronic shutter 28 is positioned in front of the laser 24, and the shutter 28 responds to control signals from the electronic circuit 80 to selectively allow passage of the laser beam. The mirror 32 is set at an angle 45° from horizontal and deflects the laser beam vertically upward.

After the beam leaves the beam source 20 it enters the beam translation system 40, which includes the following elements: a lead screw 44 mounted to the base 12; two guide posts 48 mounted to the base 12 on opposite sides of the lead screw 44; two bushing assemblies 50 slideably mounted on the guide posts 48, and a platform 52 attached to the bushings 50 to slide along the guide posts 48. The function of the beam translation system 40 is to receive the vertically oriented beam generated by the beam source 20, to redirect the beam horizontally, to focus the beam, and to translate the beam vertically in order to direct the beam in a linear manner perpendicular to the stack of discs. The lead screw 44, in conjunction with the guide posts 48, bushings 50, and platform 52, perform the linear translation of the beam.

The lead screw 44 is rotated by a motor 46. Both the lead screw 44 and motor 46 are controlled by signals generated by the electronic circuit 80. The lead screw 44 includes reed switches (not shown) at its uppermost and lowermost positions. These switches generate input signals for the electronic circuit 80, which are used to control the operation of the optical counter 10.

In this embodiment the guide posts 48 extend vertically, 24 inches above the base. The guide posts 48 are preferably made of stainless steel with a ¾ inch diameter, and a hardness of 50 to 55 C. The bushings 50 can for example be oil-impregnated, bronze bushings two inches long and flanged with a ¾ inch inner diameter.

The platform 52 and an optical detector 58 are attached to the bushings 50. The platform 52 includes another flat mirror 54 which receives the upwardly deflected beam. The mirror 54 once again deflects the beam 45° so that it propagates parallel to the counter base 12. From the mirror 54, the beam passes through a series of lenses 55, 56, 57 mounted on the platform 52 that serve to re-collimate and focus the beam to a point at the edge of the stack of discs.

Many optical systems can perform the desired focusing function. However, the following arrangement is presently preferred. The first lens 55 is preferably a plano-convex lens with a 60 mm focal length. The second lens 56 is also a plano-convex lens, which is mounted oppositely on the platform 52. The second lens 56 has a focal distance of 10 mm, and accordingly, is positioned 10 mm away from the first lens' 55 focal point (i.e. 70 mm from the first lens 55). Thus, the second lens 56 serves to recollimate the beam to a narrower diameter. The third lens 57, also a plano-convex lens, is mounted on the platform 52, and has a focal distance of 40 mm. This third lens 57 receives the collimated beam from the second lens 56 and focuses it to a point 40 mm ahead.

In the preferred embodiment, the stack of discs is positioned such that the point of intersection between the beam and the edge of the discs is spaced 40 mm from the third lens 57. In this configuration, the beam is redirected or absorbed at the edge of an optical disc so as not to strike the detector 58 when the beam is in the plane of one of the discs. However, the beam propagates through the gap between two adjacent discs to strike the detector when the beam is aligned with a gap between adjacent discs. The gap, therefore, serves as an optical waveguide for the beam focused at its entrance.

The optical detector 58 is also connected to one of the bushings 50. In this embodiment, the optical detector 58 is a helium-neon photodiode, which is connected to the bushing 50 via a right-angled mounting arm 59 so that the detector 58 moves linearly along with the beam, but on the opposite side of the stack of discs. In the preferred embodiment, this detector 58 is responsive to the measuring beam after it emerges from the gap between the stacked discs.

The stack elevator 60 includes guide posts 68 and bushings 70, an elevator platform 72, a bridge support 76 and an air cylinder 78. Positioned along the length and completely around the stack elevator 60 is an enclosure housing (not shown) used to optically isolate the discs when inserted in the optical counter 10. The housing is open at its top, and closed at its bottom where it connects to the counter base 12. The housing also includes a slot that allows for passage of the beam into the elevator housing so that the beam can traverse the discs. Similarly, a second slot is included that allows the beam to exit the elevator housing so that it can strike the detector 58.

In the preferred embodiment, the stacked discs are positioned on a spindle 64 on the raised stack elevator 60 when they are ready for scanning. The stack elevator 60 then lowers the discs into the position shown in FIG. 1 for scanning. Although not the preferred embodiment, the discs can be aligned horizontally and blown together by a puff of air prior to scanning to eliminate discs from sticking. In such a configuration, the stack elevator 60 would also be positioned horizontally. This horizontal scanning could increase the accuracy and scan time.

The guide posts 68 are positioned on opposite sides of the elevator platform 72 and are connected to the counter base 12. These guide posts 68 are oriented vertically, parallel to one another. The guide posts 68 and bushings 70 are the same type as used in the beam translation system 40. The elevator platform 72 is connected to both bushings 70 to slide along the guide posts 68. In the preferred embodiment, the spindle 64 is shaped to fit into a central alignment opening in the platform 72.

The upper end of the air cylinder 78 is connected to the underside of the platform 72 to raise and lower the platform 72. The lower portion of the air cylinder 78 is mounted to the bridge support 76 and extends down through an opening in the base 12. The air cylinder 78 is a stroke cylinder 15 inches long and contains two air lines 79 at its upper and lower end. The air lines are connected to a four-way solenoid valve with a 120 volt AC coil. The valve, which controls the elevator's operation, is controlled by a relay connected to transistor 135 in FIG. 3*b*. Also included in the air cylinder 78 are two reed switches (not shown) that generate signals for the electronic circuit 80 to indicate the position of the stack elevator 60.

The bridge support 76 serves as a stop to define the lowermost position of the elevator platform 72 and a means to mount the air cylinder. The elevator platform 72 rests directly on the air cylinder which is mounted to a bridge support 76 when in the lower position shown in FIG. 1.

Figure 4:
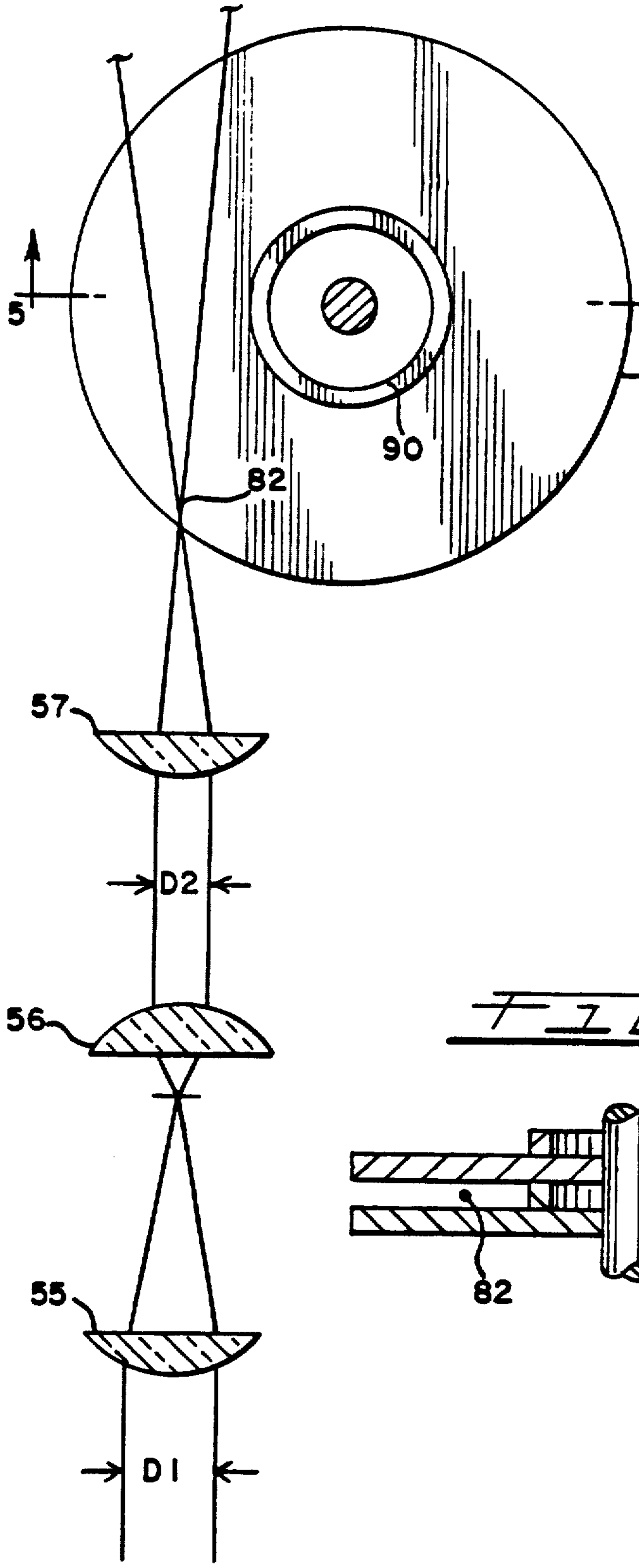
FIG. 4 is a schematic view of the path of the measuring beam in the region of the optical discs in the embodiment of FIG. 1.
Figure 5:
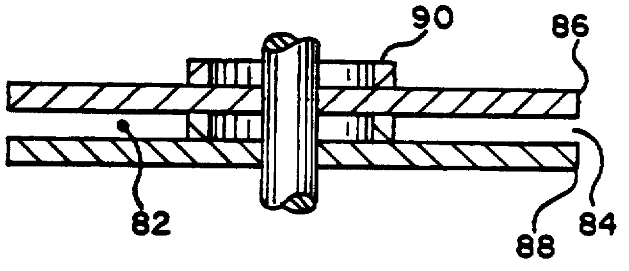
FIG. 5 is a schematic view taken along line 5—5 of FIG. 4.

FIGS. 4 and 5 show schematic views of the path of the measuring beam as it passes through the lenses 55–57, and a gap between a pair of optical discs in a stack. As illustrated, the beam 82 is focused to a point in front of a gap 84 between two optical discs 86 and 88. Also shown in FIG. 4 is the position of the beam 82 between the outer edge of the optical discs 86 and 88, and the raised ridge 90 of a disc 88. The optical detector 58 detects the beam 82 after it passes through this gap 84. When the beam is aimed at one of the discs in a stack (i.e., disc 86 or 88) the beam is redirected so that the optical detector 58 generates a reduced amplitude signal. When the beam traverses the gap 84, the beam continues to propagate between the discs as in an optical waveguide. When the beam scatters, the discs serve to redirect the beam away from the detector 58.

Also shown in FIG. 4 is the path of the laser beam as it is recollimated and focused to a point just in front of the gap 84. The first and second lenses 55 and 56 recollimate the laser beam from an initial diameter D1 to a smaller diameter D2. In the preferred embodiment, the first and second lenses 55 and 56 are configured such that this ratio is 6:1. The third lens 57 then focuses this narrower collimated beam to the desired point at the edge of the stack of discs. Because the beam incident on the lens 57 is of reduced diameter, the dispersion angle of the beam produced by the third lens 57 is also reduced. A smaller focused spot with a larger depth of focus insures in most cases, the beam will travel between the discs even if the discs are not stacked evenly.

The optical discs in FIG. 5 represent any of the discs in the stack. As illustrated in FIG. 5, the beam 82 passes between the raised ridge 90 and the outer edge of an optical disc 88. (The raised ridge 90 has been enlarged in its height in FIG. 5 for emphasis.) The path shown represents the passage of the beam 82 within the gap 84 as shown in FIG. 4. In FIG. 5, were the beam 82 aimed at a disc 88 instead, there would be no passage of any defined beam.

Turning now to FIG. 2, the optical detector 58 produces an electronic signal representative of the number of discs counted. This signal is amplified by the amplifier 92, and the amplified signal is then applied to a polarity detector 94. From there the signal passes through a low pass filter 96 and into a TTL convertor 98. After the waveform has been shaped in this manner the signal clocks a digital counter network 100. The preferred circuitry of the block diagram of FIG. 2 is presented in further detail in the electrical schematic of FIGS. 3*a* and 3*b*.

In FIG. 3*a*, the amplitude modulated signal generated by the optical detector 58 is applied to two operational amplifiers 102 and 104, configured in series. The photodetector signal applied to the amplifier 102 ranges between 0 and −200 millivolts. Minus 200 millivolts corresponds to the gaps between the optical discs and 0 millivolts corresponds to the detection of an optical disc (i.e. the voltage corresponding to the ambient level of light in the stack elevator 60). The amplifier 92 amplifies this signal to a one volt to three volt waveform: one volt designating the gap between discs and three volts designating a disc. This signal then feeds another operational amplifier 106 included in the polarity detector designated 94.

The signal generated by this amplifier 106 ranges from −10.5 volts to +10.5 volts; the negative voltage corresponds to a gap and the positive voltage corresponds to a disc. The output of the amplifier 106 feeds amplifier 108 which changes the voltage levels of its input signal from the −10.5 to +10.5 volts to a 0 volt to +5 volt wave-form; 0.0 volts designates a gap and +5 volts designates a disc. At this point the signal generated consists of a series of amplitude modulated pulses representative of the discs and the gaps between the discs, as detected by the optical detector 58. In order to remove noise, the signal is filtered by the low pass filter 96.

The low pass filter 96 includes operational amplifiers 110, 112 and 114, shown in FIG. 3*a*. The pulsed signal from operational amplifier 108 is connected to operational amplifiers 110 and 112, in parallel, and the outputs of amplifiers 110 and 112 are both connected to operational amplifier 114. The output generated by operational amplifier 114 ranges from 0 volts to 3.6 volts with a slow rise time and a steep fall time for every pulse seen on the input signal. This signal is then applied as an input to a monostable multivibrator (one shot) 116 included in the TTL converter 98.

A rise in the input to the monostable multivibrator 116 from 0 volts to 1.55 volts within 7 milliseconds or more generates a single 1.5 millisecond wide pulse at its output. The resultant TTL compatible signal is fed through two AND gates 124 and 125 (FIG. 3*b*) before being output to the counter network 100. The signal is output as TTL and switched through a 2N2222A NPN transistor 126.

Figure 3B:
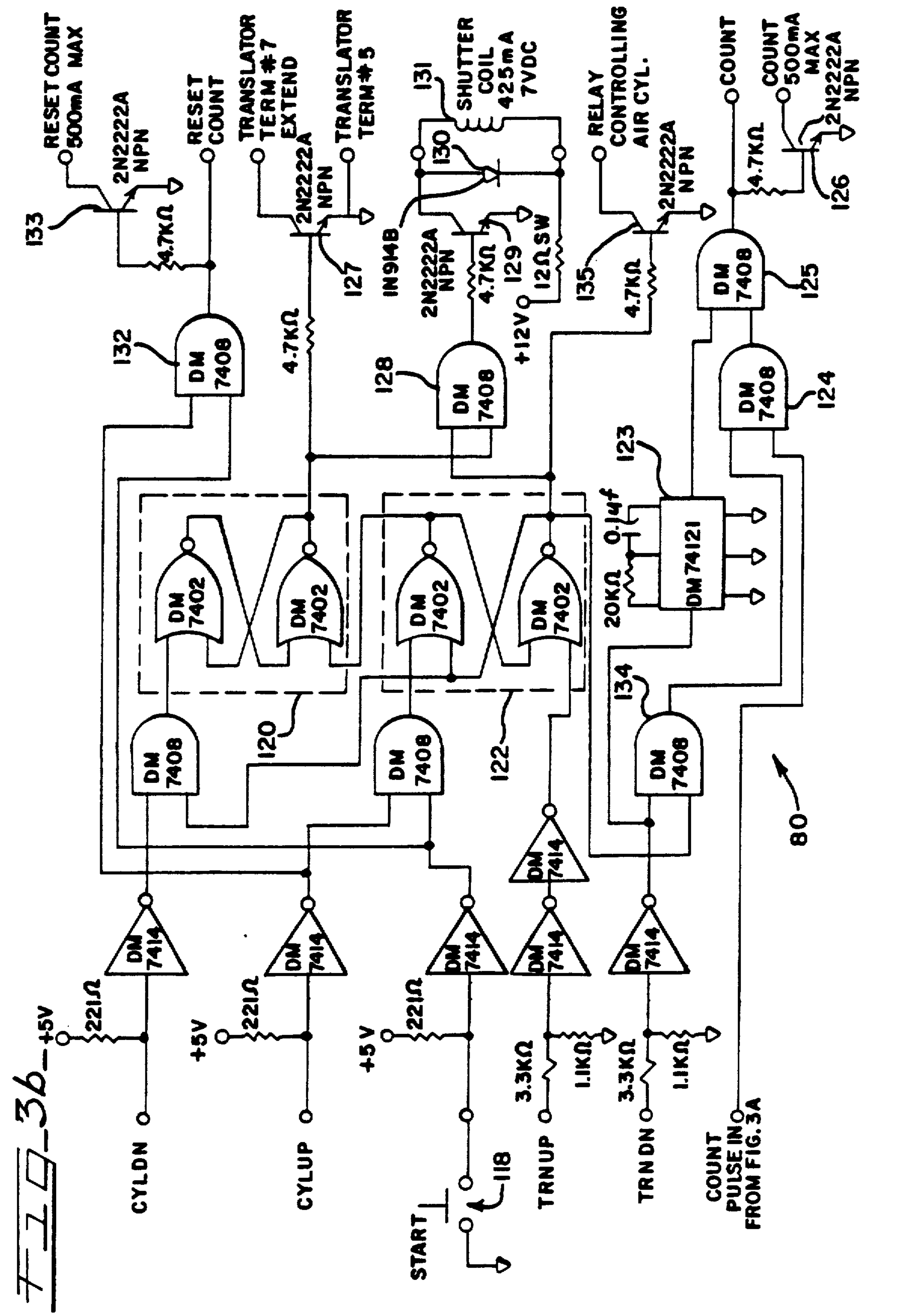

FIG. 3*b* shows the combinational logic network that generates signals to control the lead screw 44, the air cylinder 78 and the shutter 28. Both the lead screw 44 and the air cylinder 78 contain reed switches (not shown) at their uppermost and lowermost positions. The outputs from these switches are received by the combinational logic network, and are used to generate control signals that operate the optical disc counter 10. The input signals CYLDN and CYLUP indicate when the cylinder 78 is in the fully lowered and raised positions, respectively. The input signals TRNDN and TRNUP indicate when the lead screw 44 is in the fully lowered and raised positions, respectively.

At the start of a counting cycle the cylinder 78 is in the raised position and the lead screw is in the lowered position. The operator places a stack of discs on the stack elevator 60 and then momentarily closes the switch 118 to begin the automatic counting cycle. This action causes the gate 132 to reset the counter network 110 and the latch 122 to control the transistor 135 to lower the stack elevator platform 72 automatically. When the elevator platform 72 reaches the fully lowered position (as indicated by the signal CYLDN), the latch 120 changes state to open the shutter via the transistor 129 and to cause the lead screw 44 to rotate to raise the lens-containing platform 52 and cause the measuring beam to automatically scan across the stack of discs from bottom to top. During this scan the counting network 100 is incremented by signals generated by the gate 125.

The gates 134, 124, 125 and the monostable multivibrator 123 ensure that the counting network 100 is incremented only during a scan. The multivibrator 123, in combination with the AND gates 124, 125 and 134, acts as a clocking circuit to allow passage of the count pulses only while the counter 10 is scanning discs, i.e., when the lead screw 44 is traveling from its lower to upper positions.

When the platform 52 reaches the fully raised position (as indicated by the signal TRNUP), the latches 120, 122 automatically change state to close the shutter, to control the lead screw 44 to lower the lens platform 52, and to control the cylinder 78 to raise the elevator platform 72. At this point the automatic counting cycle is complete, and the counting network 100 displays the number of discs in the stack.

Those skilled in the art will recognize that a variety of components can be used to implement the functions described above. The following details of the preferred embodiment described above are provided only to define the best mode.

| Ref. No. | Item | Preferred Device |
|---|---|---|
| 24 | Laser | Newport, Inc., #U-1301 |
| 28 | Shutter | Newport, Inc., #814 |
| 32 | Flat mirror | Melle Griot, Inc., #07 MMA 004 |
| 44 | Lead screw | Industrial Devices Corp., D105B18MF2SLQ |
| 48 | Guide Posts | Thomson, Inc., |
| 50 | Bushings | Thomson, Inc., #35660 |
| 54 | Flat mirror | Melle Griot, Inc., #07 MMA 004 |
| 55 | Lens | Spindler & Hoyer, Inc., #06 3045 |
| 56 | Lens | Spindler & Hoyer, Inc., #06 3036 |
| 57 | Lens | Spindler & Hoyer, Inc. #06 3043 |
| 58 | Detector | United Detector Technology, #PIN-10D |
| 68 | Guide posts | Thomson, Inc., |
| 70 | Bushings | Thomson, Inc., #35660 |
| 78 | Air cylinder | Bimba, Inc., #0415-DUZ |
| 79 | Pneumatic valve | ARC Fluid Power, Inc., #A212SS-120-A |

The counter 10 uses a laser as the optical source to generate the measuring beam. However, a number of alternative optical sources are available that can achieve the same result. Instead of a laser beam, another form of measuring beam, sufficiently collimated, can be used. Even non-collimated light sources such as a simple diffuse optical source are possible alternatives. A diffuse source can be configured so that the light it emits is blocked by the stacked discs but manages to pass through the gap between adjacent discs so that it may be picked up by an optical detector on the opposite side.

Further, although the preferred embodiment envisions a linear translation of a measuring or laser beam, the beam can also be focused so that it passes across the edges of the discs, and is reflected by them into the detector. In this manner a pivoting scan of the measuring beam can be used. In this alternative, an optical detector would be positioned to pick up the reflections generated by the edges of each disk, and use those reflections to count the number of disks.

The advantages of the counters described above include high accuracy in counting optical discs. These counters operate reliably, in spite of variations in disc size and weight. As long as a gap appears between adjacent discs, an accurate count can be achieved. Further, the housing and elevator shaft described above isolate and protect the optical counter physically and optically.

We claim:

1. An optical counter for use with a stack of discs of the type comprising at least one disc, said discs each including an outer edge and configured to define gaps between adjacent discs, said counter comprising:
   - a base;
   - means, connected to said base, for aligning a plurality of discs about an axis;
   - an optical source operative to emit light incident upon the stack of discs;
   - means connected to said base for detecting the light emitted from the optical source after interacting with the discs; and
   - means responsive to the detecting means for generating a signal representative of the number of aligned discs.

2. The optical counter of claim 1, wherein the optical source comprises a laser.

3. An optical counter for use with a stack of discs of the type comprising at least one disc, said discs each including an outer edge and configured to define gaps between adjacent discs, said counter comprising:
   - a base;
   - means, connected to said base, for aligning a plurality of discs about an axis;
   - an optical source for generating a measuring beam;
   - means for focusing the measuring beam and directing the measuring beam at the stack of discs parallel to the discs;
   - means connected to said base for detecting the measuring beam after passing between the gaps between adjacent ones of the discs; and
   - means responsive to the detecting means for generating a signal representative of the number of aligned discs.

4. The optical counter of claim 3, wherein the optical source for generating a measuring beam comprises a laser.

5. The optical counter of claim 3, wherein the means for focusing comprises a plurality of lenses that recollimate the beam to a smaller diameter and focus the beam to its narrowest point where the beam initially intersects the stack of discs.

6. The optical counter of claim 3, wherein the means for aligning comprises a spindle that inserts through a hole formed in the center of the discs.

7. An optical counter for use with a stack of discs of the type comprising at least one disc, said discs each including an outer edge and a raised ridge positioned radially inwardly from the outer edge, said counter comprising:
   - a base;
   - means, attached to the base, for aligning a plurality of stacked discs about a center axis;
   - a laser for generating a laser beam, mounted on the base;
   - a translational unit mounted on the base and comprising means for directing said laser beam parallel to said stacked discs, at a distance spaced radially outwardly from the center axis between the raised ridge and the outer edge of each of the discs, and for moving the laser beam in a linear path so that the laser beam passes sequentially across each of the discs in the stack of discs;
   - means connected to the translational unit for focusing the laser beam to a point at the edge of the stack of discs;
   - an optical detector mounted on the translational unit and positioned to receive said laser beam after the laser beam has interacted with the stack of discs, said detector generating a waveform indicative of the number of discs in said stack; and
   - means, connected to the optical detector, for processing said waveform to discriminate between the detection of one of the discs and a gap between adjacent discs, thus providing a count of the number of discs in the stack.

8. The optical counter of claim 7, wherein the means for focusing comprises a plurality of lenses that recollimate the beam to a smaller diameter and focus the beam to its narrowest point where the beam initially intersects the stack of discs.

9. An optical counter for use with a stack of discs of the type comprising at least one disc stacked on a spindle, said discs each including an outer edge and a raised ridge positioned radially inwardly from the outer edge, said counter comprising:

a base;

a spindle for aligning a plurality of stacked discs about a center axis;

an elevational unit, mounted to the base, for accepting the spindle containing the stack of discs and lowering the discs to a position ready for counting, and then raising the discs after they have been counted to a position where the discs can be removed from the elevational unit;

a laser for generating a laser beam, mounted on the base;

a translational unit mounted on the base and comprising means for directing said laser beam perpendicular to the spindle and parallel to the discs, at a distance spaced radially outwardly from the spindle between the raised ridge and the outer edge of each of the discs, and for moving the laser beam in a linear path so the laser beam passes sequentially across each of the discs in the stack of discs;

means connected to the translational unit for focusing the laser beam to a point at the edge of the stack of discs;

an optical detector mounted on the translational unit and positioned to receive said laser beam after the laser beam has interacted with the stack of discs, said detector generating a waveform representative of the number of discs on said spindle; and means, connected to the optical detector, for processing said waveform to discriminate between the detection of one of the discs on the spindle and a gap between adjacent discs, thus providing a count of the number of discs stacked on said spindle.

10. The optical counter of claim 9, wherein the means for focusing comprises a plurality of lenses that recollimate the beam to a smaller diameter and focus the beam to its narrowest point where the beam intersects the stack of discs.

11. The optical counter of claim 9, wherein the means for processing the waveform comprises means for amplifying the waveform, means for filtering the waveform and means for converting the waveform to TTL compatible voltage levels.

* * * * *

UNITED STATES PATENT AND TRADEMARK OFFICE

CERTIFICATE OF CORRECTION

PATENT NO. : 4,994,666

DATED : February 19, 1991

INVENTOR(S) : John R. Higgison et al.

It is certified that error appears in the above-identified patent and that said Letters Patent is hereby corrected as shown below:

IN THE ABSTRACT

On the cover page, column 2, line 8 of the Abstract, please delete "detectors" and substitute therefor --detector--.

In column 2, line 30, please delete "photo-detector" and substitute therefor --photo detector--.

Signed and Sealed this

Fourth Day of August, 1992

*Attest:*

DOUGLAS B. COMER

*Attesting Officer*

*Acting Commissioner of Patents and Trademarks*